United States Patent
Ambar et al.

(10) Patent No.: US 10,616,309 B2
(45) Date of Patent: Apr. 7, 2020

(54) SYSTEMS AND METHODS FOR RESUMABLE UPLOADING OF DATA IN A SOCIAL NETWORKING SYSTEM

(71) Applicant: Facebook, Inc., Menlo Park, CA (US)

(72) Inventors: Eran Ambar, Sunnyvale, CA (US); Trevor Charles Armstrong, Renton, WA (US); David Yu Zhang, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 117 days.

(21) Appl. No.: 15/396,393

(22) Filed: Dec. 30, 2016

(65) Prior Publication Data
US 2018/0191806 A1 Jul. 5, 2018

(51) Int. Cl.
G06F 15/16 (2006.01)
H04L 29/08 (2006.01)
G06Q 50/00 (2012.01)

(52) U.S. Cl.
CPC ............ *H04L 67/06* (2013.01); *G06Q 50/01* (2013.01); *H04L 67/02* (2013.01); *H04L 67/1004* (2013.01)

(58) Field of Classification Search
CPC ......... H04L 67/06; H04L 67/02; H04L 67/10; H04L 67/1004; G06Q 50/01
See application file for complete search history.

(56) References Cited

U.S. PATENT DOCUMENTS

| | | | | |
|---|---|---|---|---|
| 8,375,124 B1* | 2/2013 | Schwartz | ................ | H04L 67/06 370/473 |
| 9,195,361 B1* | 11/2015 | Gil de Paiva | ........... | H04L 29/06 |
| 2007/0038681 A1* | 2/2007 | Pierce | .................. | G06F 11/1464 |
| 2013/0073691 A1* | 3/2013 | Quan | ...................... | H04L 67/06 709/219 |
| 2015/0156281 A1* | 6/2015 | Krieger | ................... | H04L 67/42 709/203 |
| 2015/0215400 A1* | 7/2015 | Liu | ......................... | H04L 67/06 709/217 |
| 2015/0230124 A1* | 8/2015 | Damola | ................. | H04W 4/00 370/235 |
| 2017/0093954 A1* | 3/2017 | Lim | ......................... | H04L 67/06 |

FOREIGN PATENT DOCUMENTS

WO   WO 2014037762 A1 *  3/2014  ............. H04W 4/00

* cited by examiner

*Primary Examiner* — Cheikh T Ndiaye
(74) *Attorney, Agent, or Firm* — Sheppard Mullin Richter & Hampton LLP

(57) ABSTRACT

Systems, methods, and non-transitory computer readable media can receive a request to upload a file from a user. A server of a plurality of servers can be determined to process the request to upload the file. An indication of an amount of the file that has been received by the server prior to the request to upload the file can be provided. At least a portion of the file that has not been received by the server prior to the request to upload the file can be received.

20 Claims, 9 Drawing Sheets

SYSTEMS AND METHODS FOR RESUMABLE UPLOADING OF DATA IN A SOCIAL NETWORKING SYSTEM

FIELD OF THE INVENTION

The present technology relates to the field of social networks. More particularly, the present technology relates to techniques for providing resumable uploading of data associated with social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

Users can upload various types of data to the social networking system. For example, users can upload files including various types of data, such as text, image, video, etc. Files may be uploaded using various protocols. For example, a file can be uploaded using hypertext transfer protocol (HTTP). An uploaded file can be presented on a profile page of a user. An uploaded file can also be presented through a feed, such as a newsfeed, for a user to view and access.

SUMMARY

Various embodiments of the present disclosure can include systems, methods, and non-transitory computer readable media configured to receive a request to upload a file from a user. A server of a plurality of servers can be determined to process the request to upload the file. An indication of an amount of the file that has been received by the server prior to the request to upload the file can be provided. At least a portion of the file that has not been received by the server prior to the request to upload the file can be received.

In some embodiments, the indication of the amount of the file that has been received by the server prior to the request to upload the file includes an offset that indicates a number of bytes of the file that have been received by the server prior to the request to upload the file.

In certain embodiments, the receiving at least a portion of the file comprises receiving one or more bytes starting at the offset.

In an embodiment, the determining the server of the plurality of servers to process the request to upload the file comprises hashing the request to upload the file based on one or more of: an identifier of the user, a path of the file, a size of the file, a content of the file, or an identifier associated with an application.

In some embodiments, a subsequent request to upload the file from the user is hashed to the determined server for the request to upload the file from the user.

In certain embodiments, a plurality of server instances execute on each of the plurality of servers, and a server instance of the plurality of server instances executing on the determined server to process the request to upload the file is determined.

In an embodiment, the request to upload the file includes a query to obtain the indication.

In some embodiments, the request to upload the file is based on hypertext transfer protocol (HTTP).

In certain embodiments, an opaque handle for the file is provided in response to determining that an entirety of the file has been received.

In an embodiment, an application programming interface (API) request including the opaque handle is received, and the opaque handle is substituted with the file prior to execution of logic associated with the API request.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
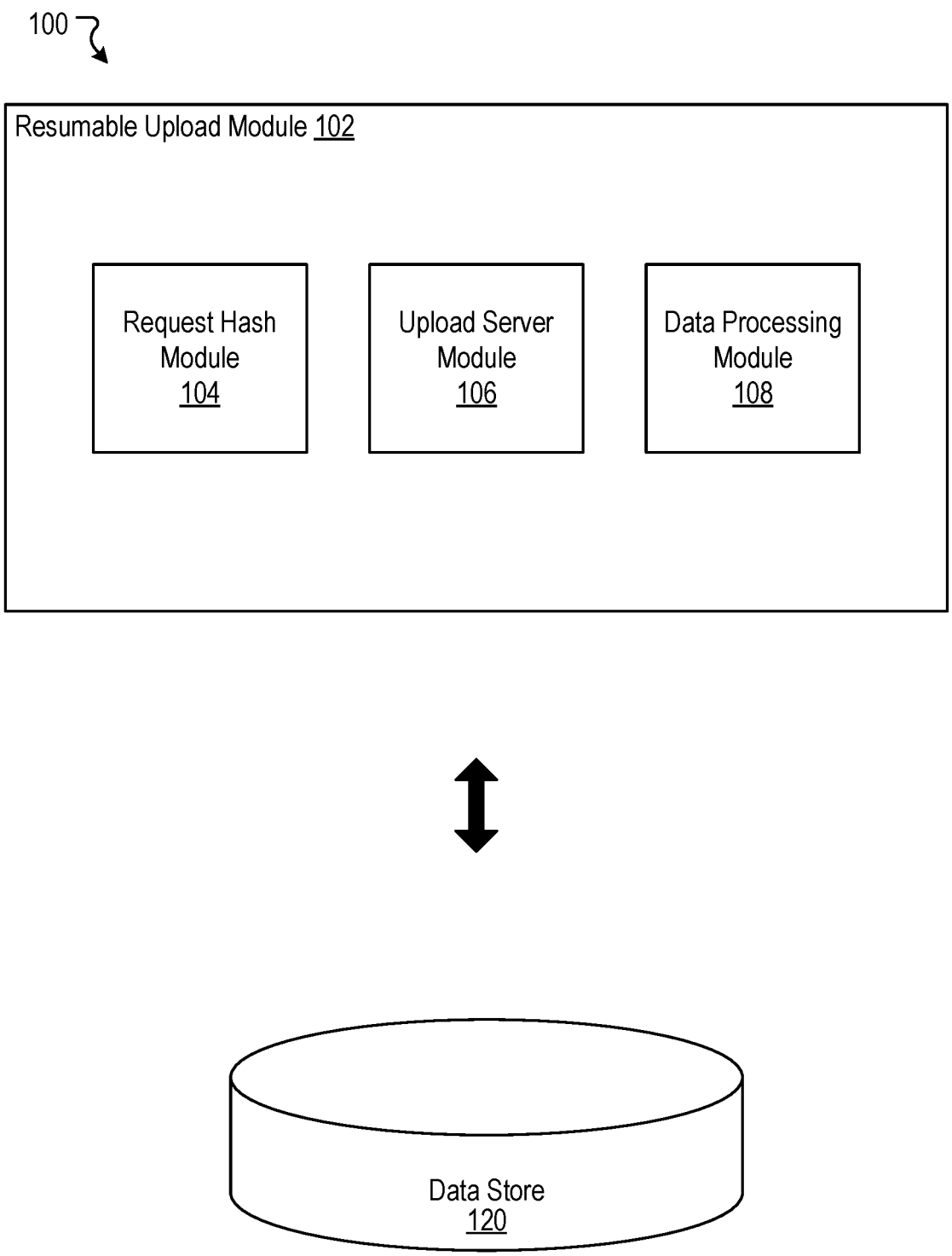
FIG. 1 illustrates an example system including an example resumable upload module configured to provide resumable uploading of data, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Resumable Uploading of Data in a Social Networking System

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide user profiles for various users through which users may add connections, such as friends, or publish content items.

Users can upload various types of data to the social networking system. For example, users can upload files including various types of data, such as text, image, video, etc. Files may be uploaded using various protocols. For example, a file can be uploaded using hypertext transfer protocol (HTTP). However, if an upload of a file using a protocol such as HTTP fails, the entire file may need to be reuploaded. Conventional approaches specifically arising in the realm of computer technology can provide uploading of files in chunks. However, chunks need to be tracked and managed on server side requiring overhead, and determining an optimal size of a chunk can be difficult. If the size of a chunk is too small, the file would be uploaded using too many chunks, which can be inefficient. If the size of a chunk is too large, an upload of each chunk would have a higher probability of failure.

An improved approach rooted in computer technology can overcome the foregoing and other disadvantages associated with conventional approaches specifically arising in the realm of computer technology. Based on computer technology, the disclosed technology can provide resumable uploading of data, such as files. If an upload of a file by a user fails before completion, a subsequent upload of the same file by the user can continue from a point where the previous upload of the file failed. A request to upload a file from a user can be received from a client. A request to upload the same file from a particular user can be routed and processed by the same server or server instance. A client can query the server handling the request to determine an amount of the file that has been previously uploaded to the server. For example, the server can provide an offset indicating a number of bytes of the file that have been previously uploaded to the server. The client can resume upload of the file with a remainder of the file that has not been uploaded to the server. For example, the client can resume uploading of the file starting from the offset. A large number of upload requests can be received from a large number of users. In order to provide resumable uploading of files at scale, the disclosed technology can make sure that a request to upload the same file from a particular user can be routed and processed by the same server or server instance each time. In some embodiments, a request to upload a file from a user can be hashed based on properties relating to the request, the file, the user, etc. Because an upload of a file can proceed in a resumable manner, received portions of a file may be processed without waiting for the entire file to be uploaded. Accordingly, processing of the file for various services can start prior to completion of the upload of the file. For example, transcoding of a file can begin with received portions of the file. In this way, in case an entire file is not uploaded in one attempt, the file can be uploaded in a continuous manner from a point where the upload failed, instead of restarting the upload of the entire file. Resumable upload can provide an efficient way of uploading files, especially large files.

FIG. 1 illustrates an example system 100 including an example resumable upload module 102 configured to provide resumable uploading of data, according to an embodiment of the present disclosure. The resumable upload module 102 can include a request hash module 104, an upload server module 106, and a data processing module 108. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the resumable upload module 102 can be implemented in any suitable combinations. For illustrative purposes, resumable uploading of data is described in connection with a social networking system, but resumable uploading of data can apply to any type of system.

The request hash module 104 can route an upload request from a user to a server. There can be multiple servers available to process upload requests. For example, servers can be web servers, and upload requests can be based on HTTP. Servers may be organized as one or more clusters. Load balancing can be performed for upload requests. An upload request from a user can be routed to one of the servers. In some embodiments, virtual machines (VMs) can execute on the servers, and a virtual machine can be a server instance. In such embodiments, an upload request can be routed to a server instance running on one of the servers. Upload requests for the same file from a particular user can be routed to the same server so that resumable uploading can be possible.

An upload request can indicate a user associated with the request and a file associated with the request. The upload request can include an authorization token for the user. The authorization token can be used to verify the user associated with the request. The request hash module 104 can route the upload request based on properties relating to the request, the file, the user, etc. For example, the upload request can be hashed based on an identifier (ID) of the user and a unique identifier for the file. In some cases, an identifier of an application associated with the request can also be considered in hashing the upload request. In some embodiments, the unique ID for the file can be a hash of content of the file and/or a size of the file. In certain embodiments, the unique ID for the file can be a universally unique identifier (UUID) generated on a client. In some embodiments, the unique ID for the file can be generated randomly. All examples herein are provided for illustrative purposes, and there can be many variations and other possibilities.

In order to utilize received data of a file in a previous upload request, the request hash module 104 can route an upload request to the same server that processed the previous upload request. A social networking system can receive and process a large number of upload requests from a large number of users. In order to provide resumable uploading of data at scale, the request hash module 104 can make sure to consistently route upload requests from users to correct servers. A client can send an upload request without being aware of a server to which to send the request, and the request hash module 104 can determine a server for the request and route the request to the server.

The upload server module 106 can manage uploads of files by users. The upload server module 106 can respond to queries from clients regarding any previously uploaded data for files. For example, the upload server module 106 can provide a number of bytes for a file that has been previously received by a server or a server instance. The upload server module 106 can also receive data for files for uploading. For instance, the upload server module 106 can receive bytes from a file that have not been previously received by a server or a sever instance. The upload server module 106 is described in more detail herein.

The data processing module 108 can process uploaded files. For example, a file can be transcoded as the file is being uploaded. Uploaded files can also be forwarded to various services, such as web services. After a file is uploaded, an opaque handle for the file can be provided to a user, and the user can refer to the uploaded file using the opaque handle, which can make requests efficient. For example, an opaque handle can be used to make various application programming interface (API) calls. The data processing module 108 is described in more detail herein.

In some embodiments, the resumable upload module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the resumable upload module 102 can be, in part or in whole, implemented as software running on one or more computing devices or systems, such as on a server system or a client computing device. In some instances, the resumable upload module 102 can be, in part or in whole, implemented within or configured to operate in conjunction or be integrated with a social networking system (or service), such as a social networking system 630 of FIG. 6. Likewise, in some instances, the resumable upload module 102 can be, in part or in whole, implemented within or configured to operate in conjunction or be integrated with a client computing device, such as the user device 610 of FIG. 6. For example, the resumable upload module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the resumable upload module 102. The data maintained by the data store 120 can include, for example, information relating to upload requests, received data (e.g., bytes) of files, properties relating to upload requests, properties relating to users, properties relating to files, hashing of requests, opaque handles, processing of uploaded files, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the resumable upload module 102 can be configured to communicate and/or operate with the data store 120. In some embodiments, the data store 120 can be a data store within a client computing device. In some embodiments, the data store 120 can be a data store of a server system in communication with the client computing device.

Figure 2A:
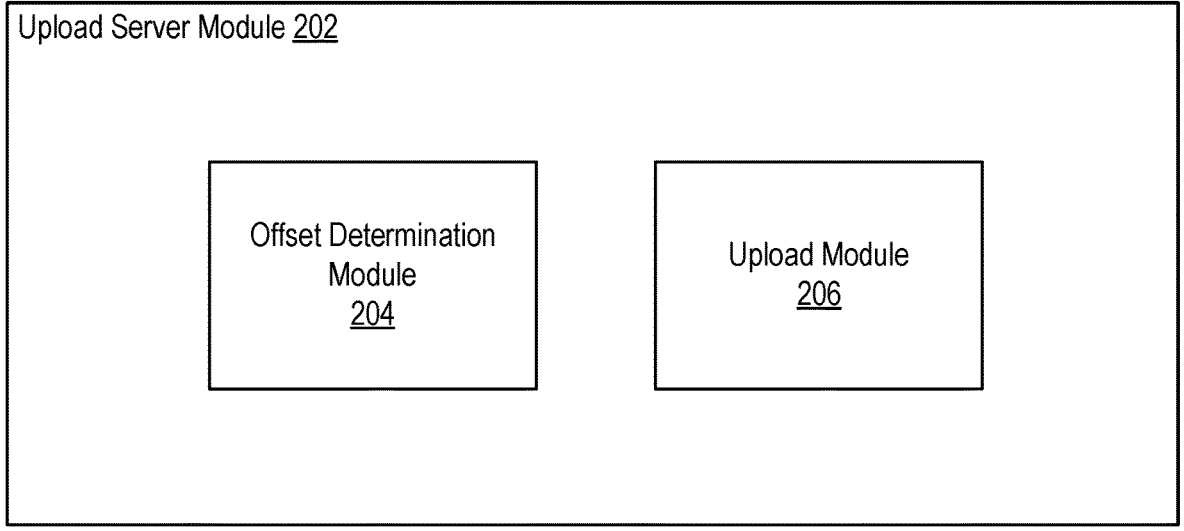
FIG. 2A illustrates an example upload server module configured to upload data in a resumable manner, according to an embodiment of the present disclosure.

FIG. 2A illustrates an example upload server module 202 configured to upload data in a resumable manner, according to an embodiment of the present disclosure. In some embodiments, the upload server module 106 of FIG. 1 can be implemented with the example upload server module 202. As shown in the example of FIG. 2, the example upload server module 202 can include an offset determination module 204 and an upload module 206.

The offset determination module 204 can provide an offset for a file that indicates a number of bytes of the file that have been received in a previous upload request. The offset for a file can be provided to a client in response to a query. For example, a request to upload a file can include a query for the offset. For an initial request to upload a file, the number of bytes can be 0, and the offset can indicate 0. For any subsequent request to upload a file, the offset can indicate the number of bytes the server currently has for the file. For example, if 800 bytes of a 1,000-byte file have been received by a server in a previous upload request, and the offset of 800 can be provided in connection with a current upload request. An offset is provided above for illustrative purposes, and any other indications that provide an amount of a file that has been previously received by a server can be used.

The upload module 206 can receive bytes for a file to be uploaded. Received bytes can include bytes that have not been received in a previous upload request. An upload request can start from the offset provided by the offset determination module 204. As just one example, if 800 bytes of the file have been received, the upload request can start from the offset of 800. In some embodiments, the upload request can start from a position prior to the offset provided by the offset determination module 204. For example, if 800 bytes of a file have been received, the upload request may start from a position prior to the offset of 800.

In some embodiments, an upload request for a file from a client can be based on HTTP. The upload request can include a sequence of HTTP requests and responses. In one example, the client can send an initial request or query for a number of bytes for the file as follows:

```
GET /uploads/42eff68f27e58059644edf635fdd7f31 HTTP/1.1
Authorization: OAuth user_token
Content-Length: 0
```

The initial request can be routed to a server based on information included in the request. The string "42eff68f27e58059644edf635fdd7f31" can indicate a unique ID for the file. The variable "user_token" can indicate an authorization token for the user. For example, the authorization token can be provided from logging in to a social networking system. The authorization token can be used to authorize or verify the user. A user ID for the user can be extracted from the authorization token. In one example, the server can respond with the offset indicating the number of bytes for the file as follows:

HTTP/1.1 200 OK
{'offset': 800}

The offset can indicate the offset of the file for the number of bytes that have been previously received by the server. The value of the offset in the server response above is 800. The client can send a subsequent request to upload remaining number of bytes for the file starting at the offset or a position prior to the offset as appropriate. In one example, the client can send a subsequent request to upload a remainder of the file as follows:

```
POST* */up/42eff68f27e58059644edf635fdd7f31
Authorization: OAuth user_token
Content-Length: 200
Content-Type: application/octet-stream
```

-continued

```
Offset: 800
Bytes <800-1000>
```

For example, bytes from offset 800 to 1,000 for the file can be uploaded to the server. The upload request can be repeated until the file is completely uploaded. After the file is completely uploaded, an opaque handle for the file can be provided as explained below.

If an upload of a file is not completed within a specified period of time, any partial file existing on a server can be deleted to make storage available. The specified period of time can be a threshold amount of time. The specified period of time can be selected as appropriate. For example, the specified period of time can be determined in units of days, hours, minutes, etc. All examples herein are provided for illustrative purposes, and there can be many variations and other possibilities.

Figure 2B:
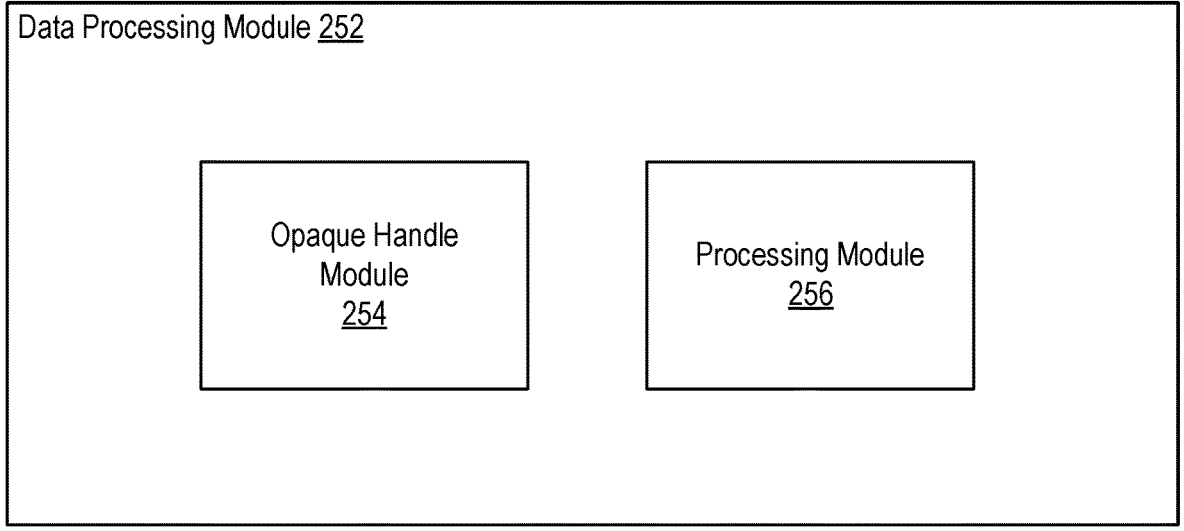
FIG. 2B illustrates an example data processing module configured to process uploaded data, according to an embodiment of the present disclosure.

FIG. 2B illustrates an example data processing module 252 configured to process uploaded data, according to an embodiment of the present disclosure. In some embodiments, the data processing module 108 of FIG. 1 can be implemented with the example data processing module 252. As shown in the example of FIG. 2, the example data processing module 252 can include an opaque handle module 254 and a processing module 256.

The opaque handle module 254 can provide an opaque handle for a file that has been completely uploaded. An opaque handle can include a reference to an uploaded file. An opaque handle for a file can be used in various requests, such as API calls, instead of including actual bytes for the file. An opaque handle can be substituted with an actual file prior to executing logic associated with a service. For example, the file represented by the opaque handle can be fetched prior to executing the logic associated with the service.

In some embodiments, an opaque handle for a file can be provided based on HTTP. In one example, when an upload request for a file completes, a server that received bytes for the file can respond as follows:

```
HTTP/1.1 200 OK
Content-Type: application/json; charset=utf-8
Content-Length: <length>
{ 'handle':
'1:dmIkZW8ubXA0:video/mp4:e:
GMYOHQBOMfubyxcBAHOP6xQAAAAAbswMA
AAz:1442963756' }
```

The handle can indicate an opaque handle for the file. The value of the handle in the server response above is "1:dmIkZW8ubXA0:video/mp4:e:GMYOHQBOMfubyxcBAHOP6xQAAAAAbswMAAAz:1442963756." The variable "length" can indicate a length of the handle. All examples herein are provided for illustrative purposes, and there can be many variations and other possibilities.

The processing module 256 can apply various types of processing to uploaded files. The processing module 256 can forward uploaded files to various services. For example, an uploaded video file can be transcoded. In some embodiments, the processing module 256 can start processing received bytes of a file prior the entire file being uploaded. For example, received portions of a file can be transcoded prior to the entire file being uploaded. In this way, the disclosed technology can process files in an efficient manner by processing portions of files that are received by the server prior to completion of upload of the files. In some embodiments, various services can be invoked for uploaded files using API calls. As explained above, an opaque handle for an uploaded file can be used in API calls, instead of the actual file.

Figure 3A:
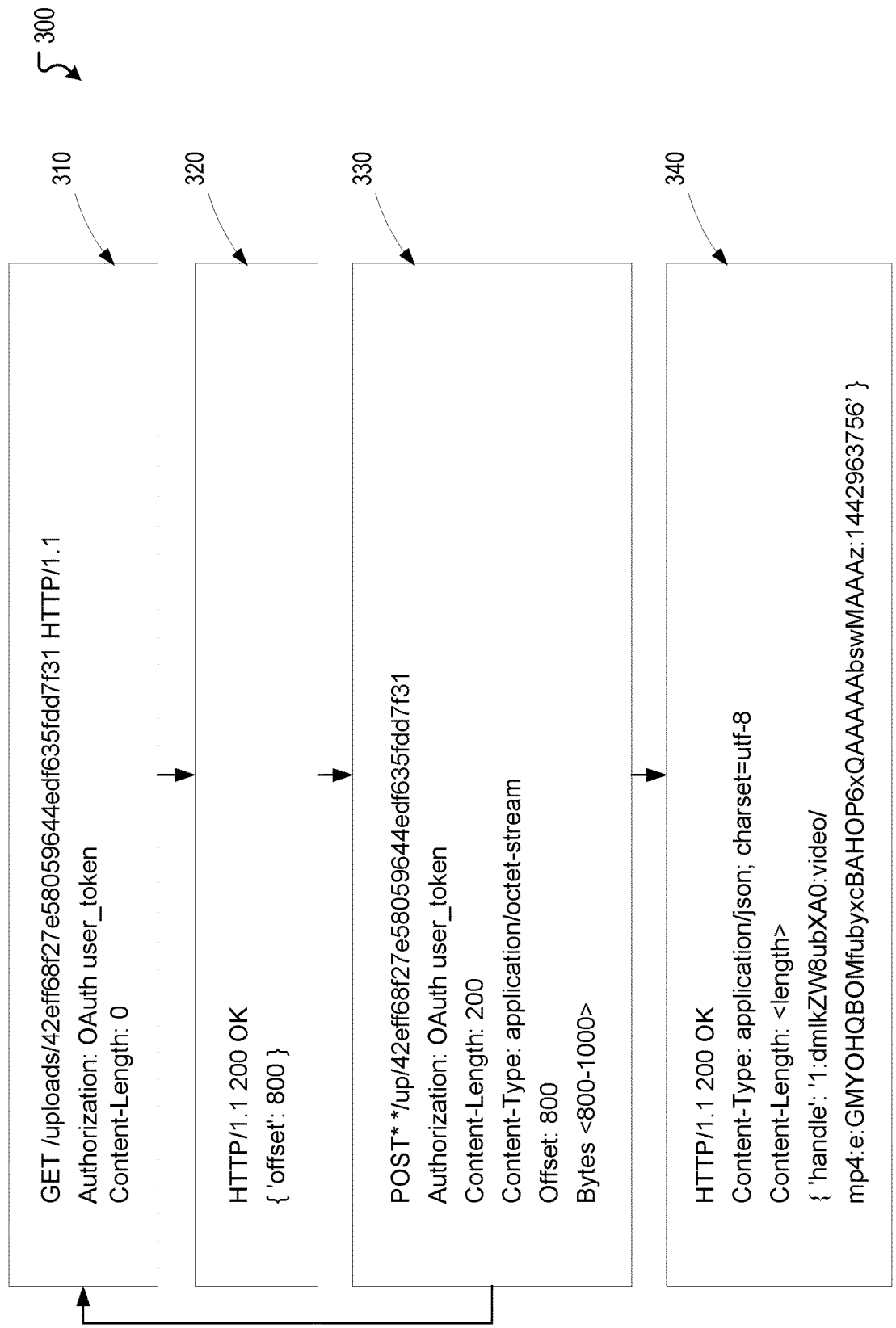
FIG. 3A illustrates an example scenario for providing resumable uploading of data, according to an embodiment of the present disclosure.

FIG. 3A illustrates an example scenario 300 for providing of resumable uploading of data, according to an embodiment of the present disclosure. The example scenario 300 illustrates a sequence of HTTP requests and responses used in resumable uploading of a file. A HTTP request 310 is sent from a client and routed to an appropriate server. The HTTP request 310 can request a number of bytes for the file. The HTTP request 310 can include an authorization token for a user requesting the upload of the file and a unique ID for the file. A HTTP response 320 is sent from the server to the client. The HTTP response 320 can include an offset for the file. A HTTP request 330 is sent from the client to the server. The HTTP request 330 can be a post request to upload bytes for the file starting from the offset. The HTTP request 330 can include the authorization token for the user, a type of data included in the file, a length or number of bytes to be posted, and the offset. The HTTP request 330 can include the bytes to be posted in the body of the request. If the upload fails, the server can send the client a HTTP response indicating that the upload failed. The client can resume the upload by sending a new HTTP request 310. Sending of the request 310, the response 320, and the request 330 can be repeated until the file is completely uploaded. Once the file is completely uploaded, a HTTP response 340 can be sent from the server to the client. The HTTP response 340 can include an opaque handle for the file.

Figure 3B:
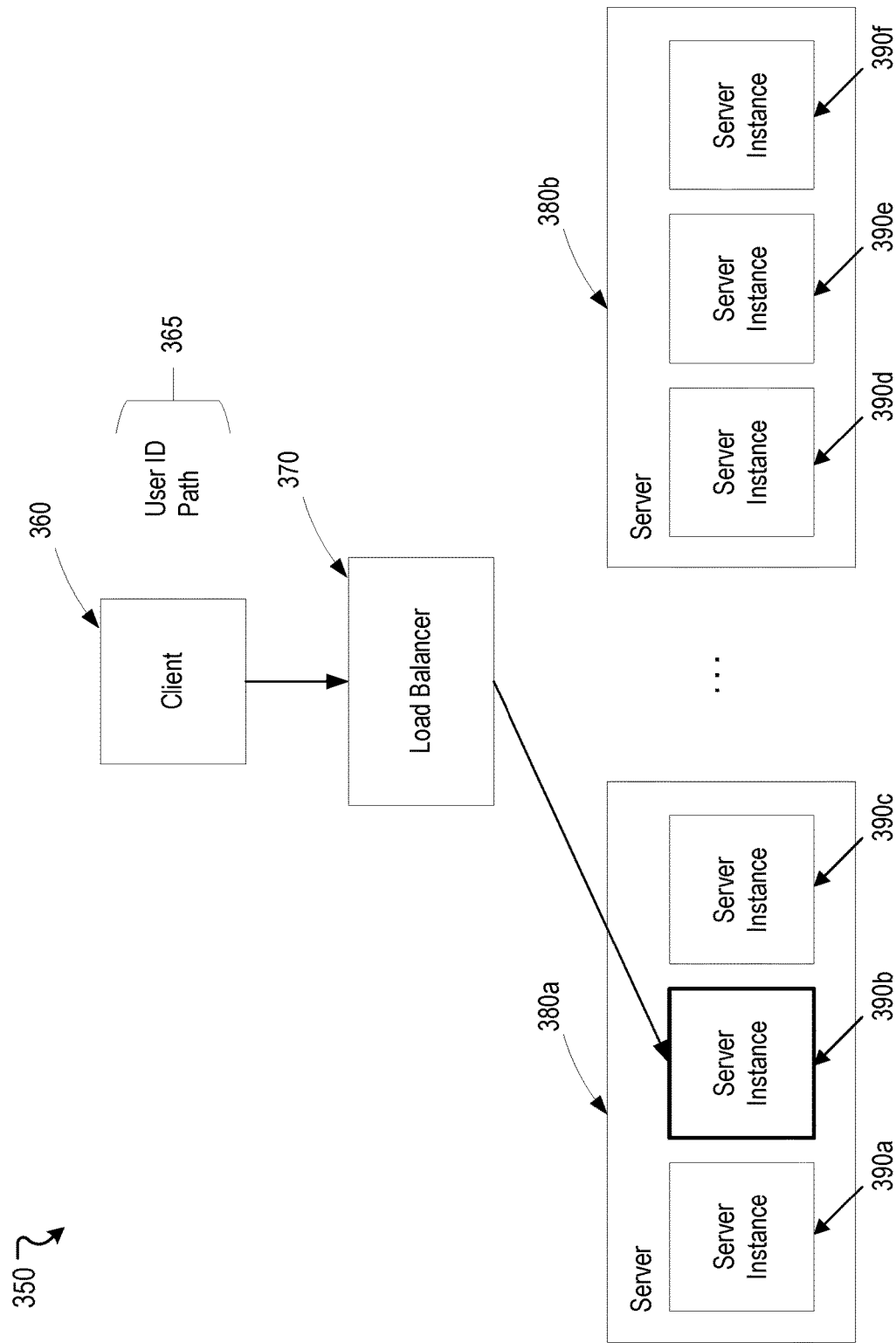
FIG. 3B illustrates an example scenario for routing upload requests to servers or server instances, according to an embodiment of the present disclosure.

FIG. 3B illustrates an example scenario 350 for routing upload requests to servers or server instances, according to an embodiment of the present disclosure. A client 360 can send an upload request for a file from a user. The upload request can be received by a load balancer 370. The load balancer 370 can hash the upload request based on information associated with the upload request. In some embodiments, the upload request can be hashed based on a user ID of the user and a path indicating the file. For example, the path can be a hash of the file's content and/or size. There can be multiple servers 380, which are running multiple server instances 390. For example, a first server 380a has three server instances 390a, 390b, and 390c, and a second server 380b has three server instances 390d, 390e, and 390f. The load balancer 370 can hash the upload request to one of the servers 380. Further, the load balancer 370 can hash the upload request to a server instance 390 on the selected server 380. In the example scenario 350, the upload request is hashed to the first server 380a and the server instance 390b. The upload request for the file can be consistently hashed to the first server 380a and the server instance 390b.

Figure 4:
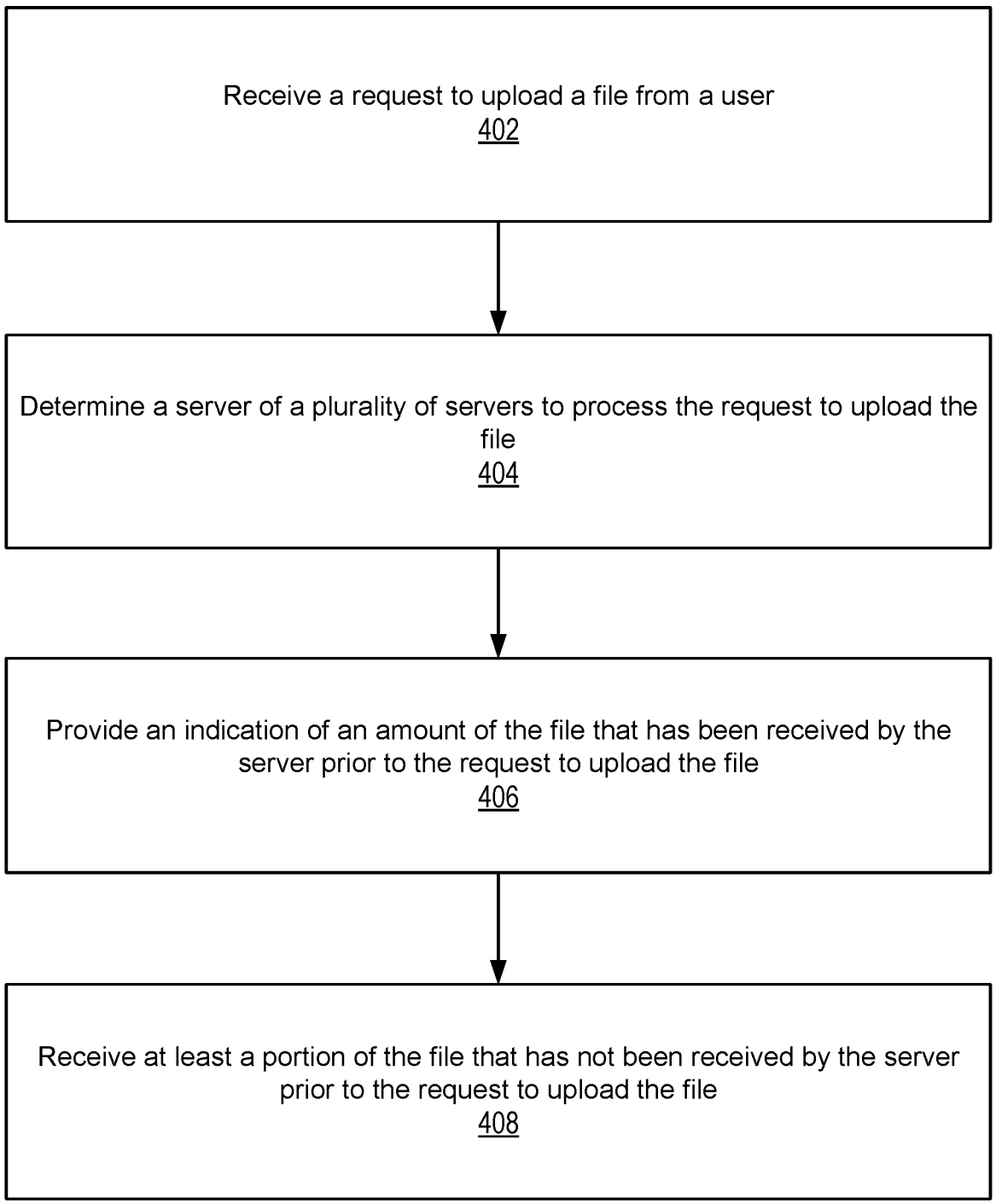
FIG. 4 illustrates an example first method for providing resumable uploading of data, according to an embodiment of the present disclosure.

FIG. 4 illustrates an example first method 400 for providing resumable uploading of data, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can receive a request to upload a file from a user. At block 404, the example method 400 can determine a server of a plurality of servers to process the request to upload the file. At block 406, the example method 400 can provide an indication of an amount of the file that has been received by the server prior to the request to upload the file. At block 408, the example method 400 can receive at least a portion of the file that has not been received by the server prior to the request to upload the file. Other suitable techniques that incorporate various features and embodiments of the present disclosure are possible.

Figure 5:
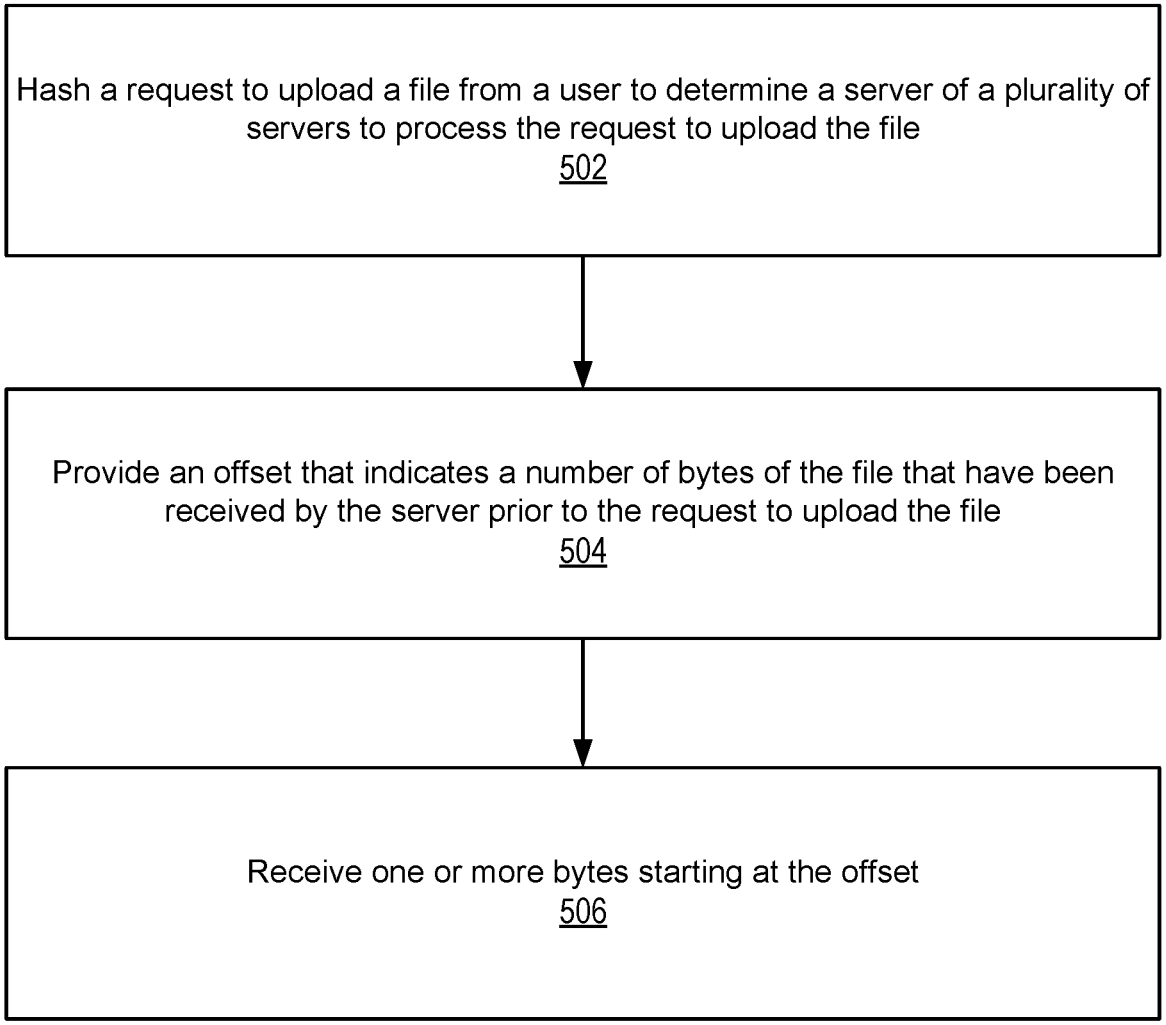
FIG. 5 illustrates an example second method for providing resumable uploading of data, according to an embodiment of the present disclosure.

FIG. 5 illustrates an example second method 500 for providing resumable uploading of data, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can hash a request to upload a file from a user to determine a server of a plurality of servers to process the request to upload the file. The request to upload the file from the user can be similar to the request to upload the file from the user explained in connection with FIG. 4. The server of the plurality of servers can be similar to the server of the plurality of servers explained in connection with FIG. 4. In some embodiments, the request to upload the file can be hashed based on one or more of: an identifier of the user, a path of the file, a size of the file, a content of the file, or an identifier associated with an application. At block 504, the example method 500 can provide an offset that indicates a number of bytes of the file that have been received by the server prior to the request to upload the file. In some embodiments, the indication of the amount of the file that has been received by the server prior to the request to upload the file explained in connection with FIG. 4 can include the offset that indicates the number of bytes of the file that have been received by the server prior to the request to upload the file. At block 506, the example method 500 can receive one or more bytes starting at the offset. In certain embodiments, the receiving at least a portion of the file that has not been received by the server prior to the request to upload the file explained in connection with FIG. 4 can include the receiving one or more bytes starting at the offset. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
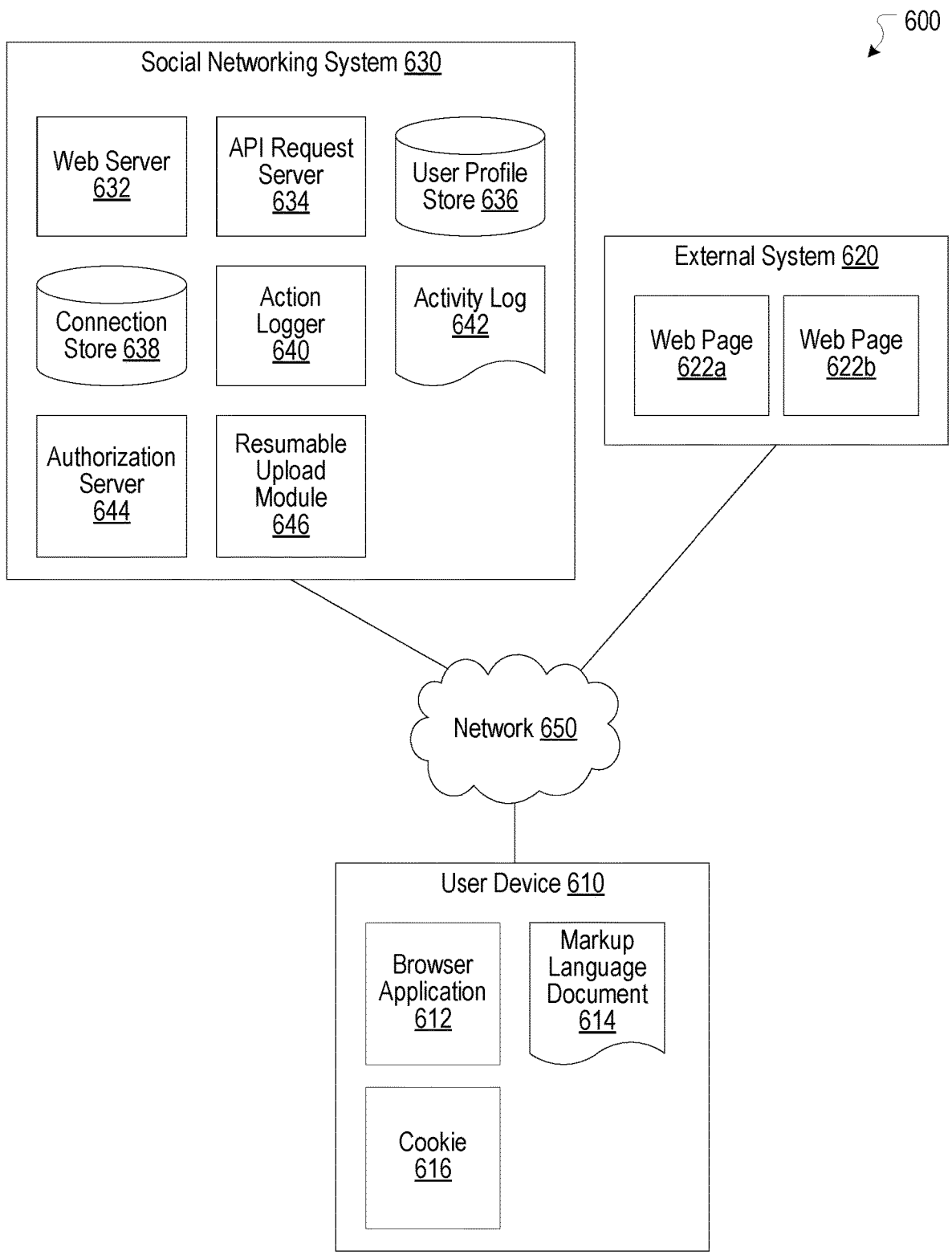
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an resumable upload module 646. The resumable upload module 646 can be implemented with the resumable upload module 102, as discussed in more detail herein. In some embodiments, one or more functionalities of the resumable upload module 646 can be implemented in the user device 610.

Hardware Implementation

Figure 7:
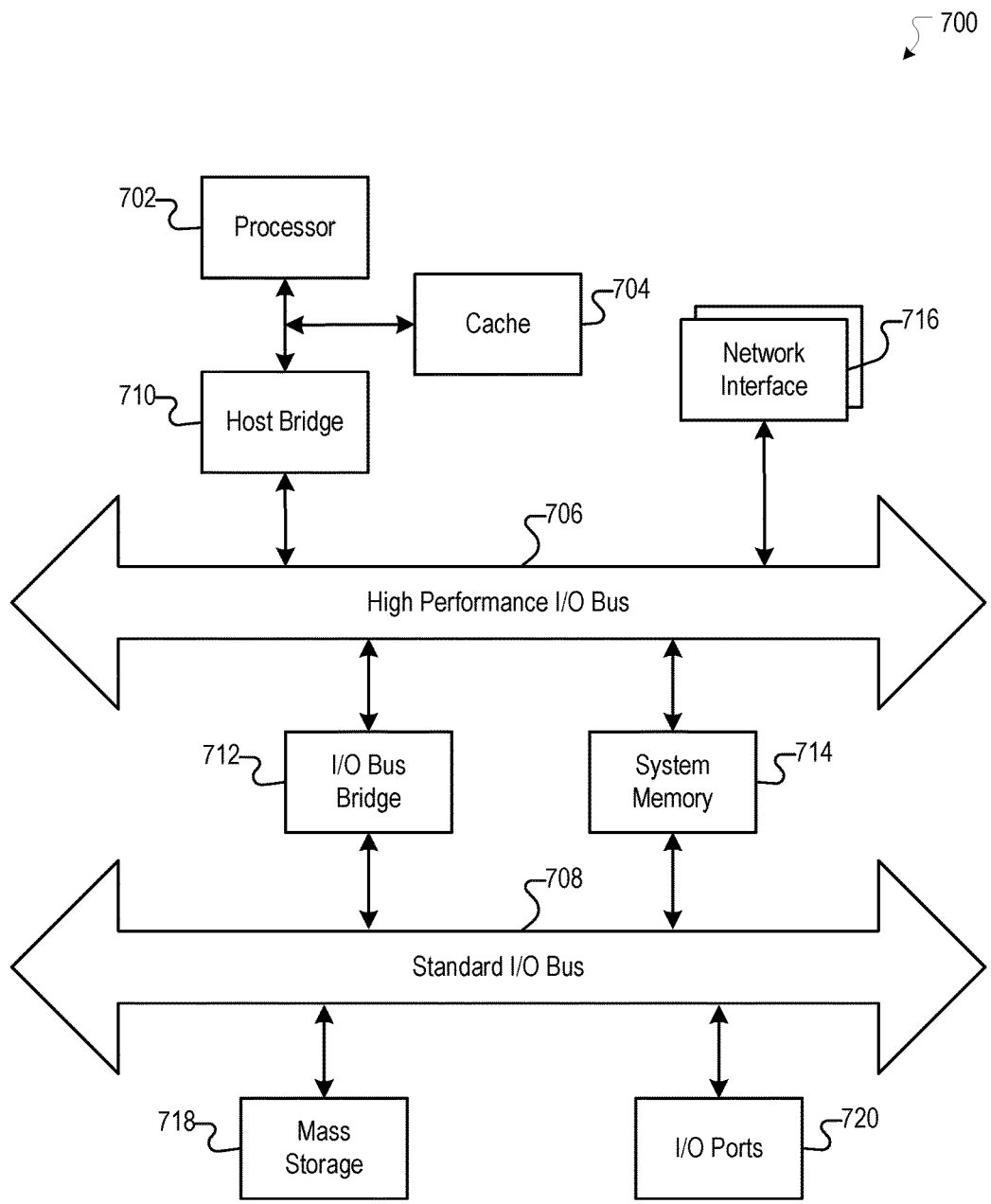
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs));

other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   receiving, by a computing system, a request to upload a file from a user, wherein the request includes an authorization token of a user associated with the request;
   hashing, by the computing system, the request based at least in part on a user ID associated with the user, a file identifier associated with the file, and an application identifier of an application associated with the request;
   determining, by the computing system, a server of a plurality of servers to process the request to upload the file based at least in part on the hashed request;
   providing, by the computing system, an indication of an amount of the file that has been received by the server prior to the request to upload the file; and
   receiving, by the computing system, at least a portion of the file that has not been received by the server prior to the request to upload the file.

2. The computer-implemented method of claim 1, wherein the indication of the amount of the file that has been received by the server prior to the request to upload the file includes an offset that indicates a number of bytes of the file that have been received by the server prior to the request to upload the file.

3. The computer-implemented method of claim 2, wherein the receiving at least a portion of the file comprises receiving one or more bytes starting at the offset.

4. The computer-implemented method of claim 1, wherein the hashing the request is further based at least in part on at least one of: a size of the file, a content of the file, or a file path of the file.

5. The computer-implemented method of claim 4, wherein a subsequent request to upload the file from the user is hashed to the determined server for the request to upload the file from the user.

6. The computer-implemented method of claim 1, wherein a plurality of server instances execute on each of the plurality of servers, and wherein the method further comprises determining a server instance of the plurality of server instances executing on the determined server to process the request to upload the file.

7. The computer-implemented method of claim 1, wherein the request to upload the file includes a query to obtain the indication.

8. The computer-implemented method of claim 1, wherein the request to upload the file is based at least in part on hypertext transfer protocol (HTTP).

9. The computer-implemented method of claim 1, further comprising providing an opaque handle for the file in response to determining that an entirety of the file has been received.

10. The computer-implemented method of claim 9, further comprising:
    receiving an application programming interface (API) request including the opaque handle; and
    substituting the opaque handle with the file prior to execution of logic associated with the API request.

11. A system comprising:
    at least one hardware processor; and
    a memory storing instructions that, when executed by the at least one processor, cause the system to:
      receiving a request to upload a file from a user, wherein the request includes an authorization token of a user associated with the request;
      hashing the request based at least in part on a user ID associated with the user, a file identifier associated with the file, and an application identifier of an application associated with the request;
      determining a server of a plurality of servers to process the request to upload the file based at least in part on the hashed request;
      providing an indication of an amount of the file that has been received by the server prior to the request to upload the file; and
      receiving at least a portion of the file that has not been received by the server prior to the request to upload the file.

12. The system of claim 11, wherein the indication of the amount of the file that has been received by the server prior to the request to upload the file includes an offset that indicates a number of bytes of the file that have been received by the server prior to the request to upload the file.

13. The system of claim 12, wherein the receiving at least a portion of the file comprises receiving one or more bytes starting at the offset.

14. The system of claim 11, wherein the hashing the request is further based at least in part on at least one of: a size of the file, a content of the file, or a file path of the file.

15. The system of claim 14, wherein a subsequent request to upload the file from the user is hashed to the determined server for the request to upload the file from the user.

16. A non-transitory computer readable medium including instructions that, when executed by at least one hardware processor of a computing system, cause the computing system to:
   receiving a request to upload a file from a user, wherein the request includes an authorization token of a user associated with the request;
   hashing the request based at least in part on a user ID associated with the user, a file identifier associated with the file, and an application identifier of an application associated with the request;
   determining a server of a plurality of servers to process the request to upload the file based at least in part on the hashed request;
   providing an indication of an amount of the file that has been received by the server prior to the request to upload the file; and
   receiving at least a portion of the file that has not been received by the server prior to the request to upload the file.

17. The non-transitory computer readable medium of claim 16, wherein the indication of the amount of the file that has been received by the server prior to the request to upload the file includes an offset that indicates a number of bytes of the file that have been received by the server prior to the request to upload the file.

18. The non-transitory computer readable medium of claim 17, wherein the receiving at least a portion of the file comprises receiving one or more bytes starting at the offset.

19. The non-transitory computer readable medium of claim 16, wherein the hashing the request is further based at least in part on at least one of: a size of the file, a content of the file, or a file path of the file.

20. The non-transitory computer readable medium of claim 19, wherein a subsequent request to upload the file from the user is hashed to the determined server for the request to upload the file from the user.

\* \* \* \* \*